UNITED STATES PATENT OFFICE.

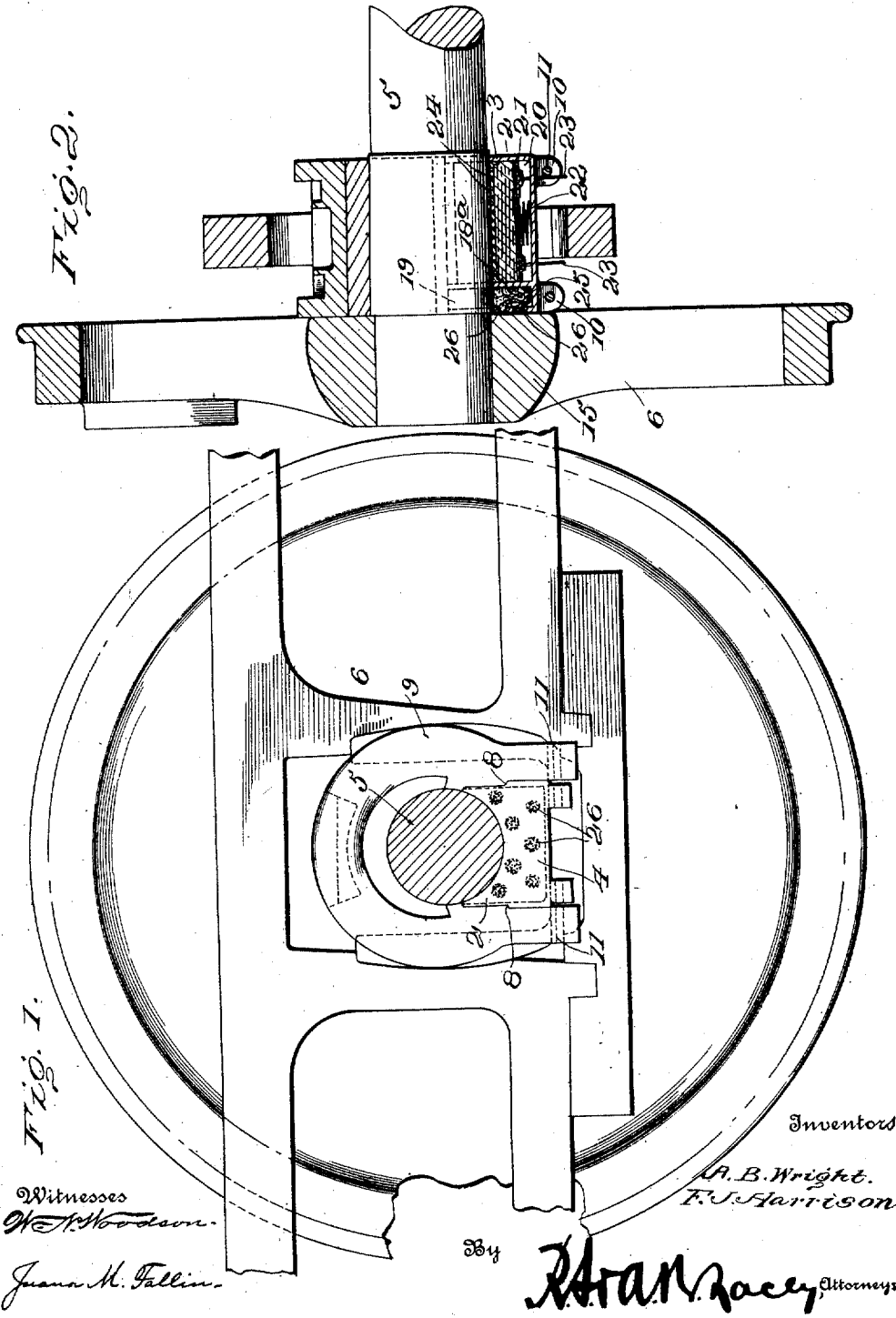

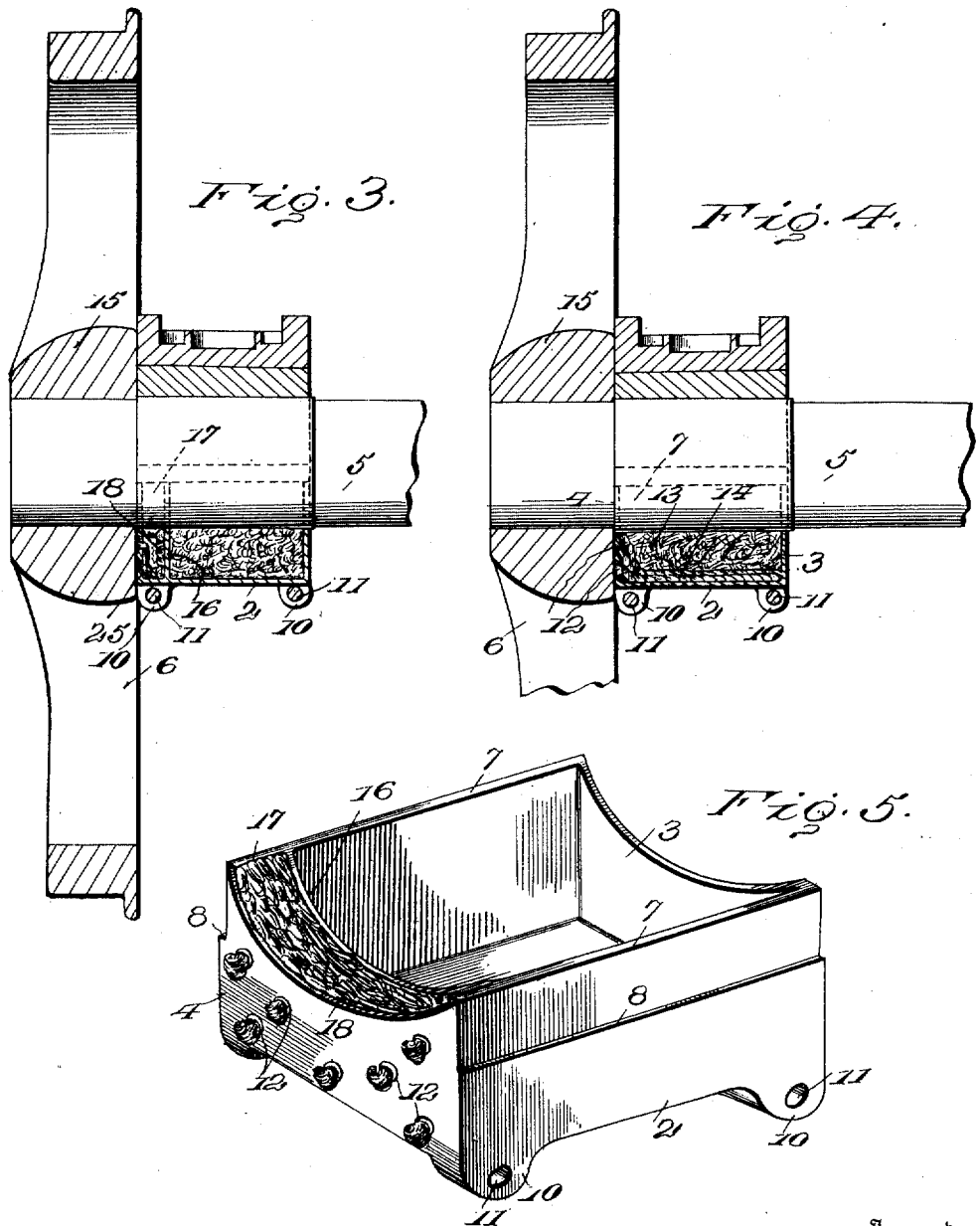

ANSON B. WRIGHT, OF NEWPORT, AND FREDERICK J. HARRISON, OF DUBOIS, PENNSYLVANIA.

LUBRICATING JOURNAL-BOX.

993,808. Specification of Letters Patent. Patented May 30, 1911.

Application filed September 13, 1910. Serial No. 581,885.

*To all whom it may concern:*

Be it known that we, ANSON B. WRIGHT and FREDERICK J. HARRISON, citizens of the United States, residing at Newport and Dubois, respectively, in the counties of Perry and Clearfield, respectively, and State of Pennsylvania, have invented certain new and useful Improvements in Lubricating Journal-Boxes, of which the following is a specification.

This invention relates to lubricators for the journals of locomotives, car trucks and other journals subjected to end thrust and friction and the invention relates particularly to the lubricating cellars of such journals.

One object of the invention is to provide a means for lubricating the contact surfaces of a hub liner and a journal box, thus preventing the excessive lateral wear, preventing cutting of the hubs, retaining the alinement of the engine, increasing the life of the journal brasses, preventing the stripping of guides and rods and preventing excessive flange wear by keeping the engine in normal position and in proper lateral alinement.

Another object designed to be attained by our invention is to prolong the life of grease cellars by preventing oil from getting back into the grease cellar and softening the grease, thus causing the perforated lining plate which contacts with the axle to become hot, thus preventing the proper lubrication of the journals by the grease, and causing the axle to run hot and cut. Furthermore, in this connection, we design to prevent any of the oil applied to the hub from reaching the perforated lining plate or getting back into the grease cellar and thus secure a great saving of oil.

A further object is to provide a cellar of the character described of a very simple construction requiring but little change from the former cellar at present made and no change in the journal boxes and which is adapted to be applied to practically all classes of journals whether the journals are lubricated with oil or grease.

We have shown in the accompanying drawings two forms of our invention, one form being used where oil is to be applied to the axle and the other form being used where grease is to be applied thereto and oil used as a lubricating medium for the hub.
In these drawings: Figure 1 is a face view of a wheel and journal box therefor with our improved cellar applied thereto; Fig. 2 is a longitudinal section through a journal box with one form of our cellar thereon;
Fig. 3 is a like view, but showing another form of cellar; Fig. 4 is a like view to Fig. 2, but showing still another form of cellar; and, Fig. 5 is a perspective view of the form of cellar shown in Fig. 3, detached from the journal.

Corresponding and like parts are referred to in the following description and indicated in all the views of the drawings by the same reference characters.

The general form of the cellar is shown in Fig. 5. In this figure, 2 designates a cellar of an ordinary construction, the cellar being rectangular in plan and cross section and open at the top as is usual in this class of devices, the ends 3 and 4 of the cellar being concavely curved so as to fit against the axle 5 of the wheel 6. The wheel and axle are of any usual type. The sides 7 of the lubricating cellar are formed with the usual longitudinally extending shoulders 8 whereby the cellar is engaged and held extending in position by the yoke 9 of the journal box. The bottom of the cellar is formed with depending lugs 10 through which passes the pins 11, as shown in Fig. 1, these pins holding the cellar in place and rigidly locked to the yoke 9.

The simplest form of cellar is that shown in Fig. 4. In this the front wall 4 is formed with a plurality of perforations 12. In use the cellar is to be filled with packing or waste 13 and disposed upon the bottom of the cellar and beneath the waste are a plurality of strands of wicking 14, these strands extending out through the perforations 12.
The wheel is formed with a hub 15, as is usual in wheels of this character, and the projecting ends of the strands 14 of wicking are intended to rub against the inside face of the hub 15 and lubricate the same. In practical use, the cellar is to be filled with oil which is absorbed by the waste 13 and the wicking 14. This oil will be conducted by capillary attraction along the wicks 14 and will be deposited against the inner face of the hub 15, thus lubricating the contacting surface of the journal box and the hub, as illustrated in Fig. 4.

It is oftentimes desirable to separate the oil used for lubricating the axle and the oil used for lubricating the hub, and for this purpose we use the cellars shown in Figs. 3 and 5. In this form the interior of the cellar is divided by a transverse partition 16 which is disposed adjacent to the outer end of the cellar, but, of course, spaced from said outer end a sufficient distance to accommodate a sufficient supply of wicking. The end of the cellar is formed with the perforations 12 before described and the compartment 17 between the partition 16 and the end of the cellar is filled with strands of wicking designated 18. The ends of these strands project out through the openings 12 in the same manner as previously described and contact with the inner face of the hub 15, thus lubricating the same. It will be seen that in this form of the invention the oil used for lubricating the axle is not mixed with the oil which is used for lubricating the hub liner.

Where grease is used for lubricating the axle it is particularly necessary that oil should be kept away from contact with the grease as the oil will tend to disintegrate the grease, soften it and thus cause the journal to run hot. To this end we have devised the form of cellar shown in Figs. 1 and 2. This cellar is likewise provided with the transversely extending partition which is designated 18ª and which divides the wick and oil compartment 19 from the grease compartment 20. Disposed within the grease compartment 20 is the follower plate 21 upon which the grease is placed. The follower plate is forced upward toward the axle by means of a compression spring 22 and is guided in its upward movement by depending guide pins 23. Covering the compartment 20 and resting against the axle is the perforated plate 24. The oil compartment is provided with a plurality of wicks 25 which project out through the openings 26 in the end wall of the cellar and thereby distribute oil to the inner face of the hub liner, as previously described. It will be seen that the construction of cellar shown in Figs. 1 and 2, is precisely the same as the construction shown in Fig. 5, except that provision is made for forcing the grease in the compartment 20 against the axle or against the perforated intermediate plate 24.

The practical operation of our invention is, of course, obvious from the above description. We have found by actual test that this form of cellar as devised by us gives a perfect lubrication to the hub liner and that the form shown in Figs. 1 and 2 prevents the oil used for lubricating the hub liner from getting into the grease compartment. The cellar devised by us after being once supplied, requires but little attention. It prevents all grit and dust from reaching the perforated grease plate 24 and prolongs the life of this plate by keeping it true against the journal, thereby increasing its efficiency. The life of the journal brasses is also increased, as the improved lubrication secured prevents any cutting of the brass. By preventing the wear of the hub we retain the normal alinement on the cross and longitudinal positions and the life of the journal and hub is prolonged and loose crown brass caused by friction is prevented.

Having thus described the invention, what is claimed as new is:

1. A cellar for journal boxes of the character described, having end walls formed with concavely curved upper edges, one of the end walls being provided with a plurality of perforations, in combination with a plurality of wicks disposed within the cellar, the ends of the wicks projecting through the perforations and conducting lubricant to the outer face of the cellar.

2. The combination with a journal box, an axle passing therethrough and a wheel on the axle having a hub, of a cellar forming the lower section of the journal box, one end wall of the cellar being in approximate contact with the inner face of the hub and being formed with a plurality of perforations, and wicks carried within the cellar and projecting through the perforations in the end wall thereof into contact with the inner face of the hub, said wicks acting to distribute oil from the interior of the cellar to the face of the hub.

3. A cellar for journal boxes of the character described having end walls, each formed with concavely curved upper edges and a transverse partition dividing the cellar into two compartments and also having its upper edge concavely curved, the end wall of the cellar being formed with a plurality of perforations and a plurality of wicks carried within the compartment adjacent to the perforated end wall, the ends of the wicks passing through the perforations and being adapted to lubricate the hub of the wheel.

4. A cellar for journal boxes of the character described, having a grease compartment and an oil compartment separated from each other, means disposed within the grease compartment for distributing grease to the axle supported in such journal, the end wall of said cellar adjacent to the oil compartment being formed with perforations, and wicking carried in the oil compartment and passing out through said perforations.

5. The combination with a journal box, an axle passing therethrough, and a wheel on the axle having a hub, of a cellar forming part of the journal, said cellar being divided into two compartments by a transverse wall extending across the major axis of the cellar, the outer end wall of the cellar being formed with perforations leading into the adjacent oil compartment, wicks disposed within the oil compartment, the ends thereof extending out through the perforations and contacting with the inner face of the hub, a follower disposed in the grease compartment, and a perforated plate covering said grease compartment and contacting with the axle.

6. The combination with a journal, an axle passing therethrough, and a wheel on the axle having a hub, of a cellar forming part of the journal, the interior of the cellar being divided into two compartments by a transversely extending wall, the outer of said compartments being adapted to receive oil and the other being adapted to receive grease, the outer end wall of the cellar being formed with perforations leading into the oil compartment, a spring actuated grease follower located within the grease compartment, guides attached to the follower and projecting through the cellar, a curved perforated plate carrying the grease compartment, and wicking disposed within the oil compartment and extending out through the perforations in the end wall into contact with the inner face of the hub.

In testimony whereof, we affix our signatures in presence of witnesses.

ANSON B. WRIGHT. [L. S.]
FREDERICK J. HARRISON. [L. S.]

Witnesses:
JOHN S. EBY,
CY. M. MEMINGER,
W. H. WILLIAMS,
W. IRVING FINCH.

---

Copies of this patent may be obtained for five cents each, by addressing the "Commissioner of Patents, Washington, D. C."